Nov. 10, 1925.

N. A. NEWDICK 1,560,716

CONVEYER

Filed Sept. 6, 1923    2 Sheets-Sheet 1

Inventor
Norton A. Newdick

By H. S. McDowell
Attorney

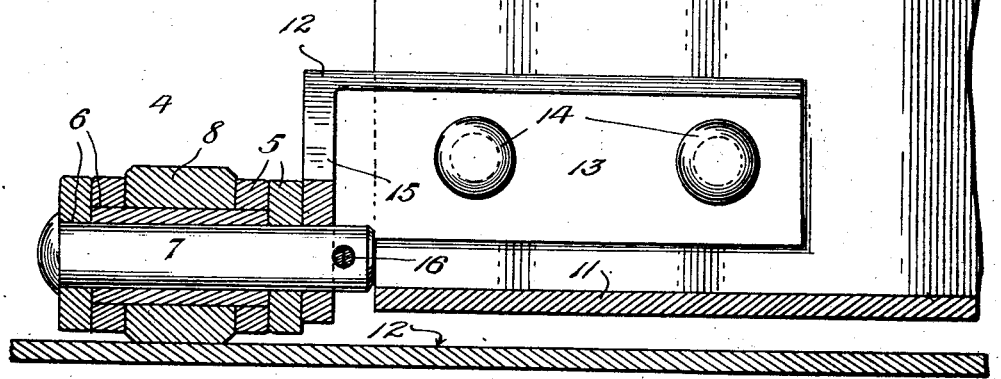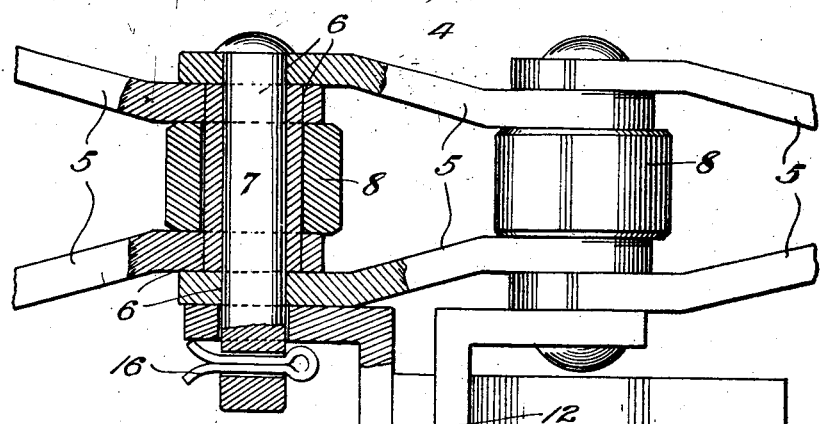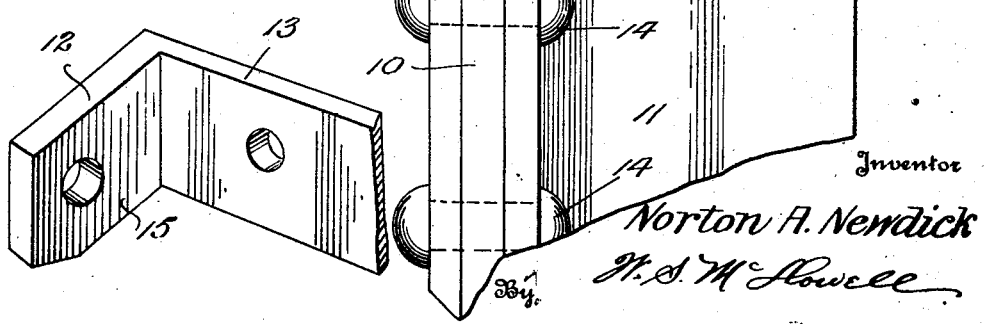

Patented Nov. 10, 1925.

1,560,716

UNITED STATES PATENT OFFICE.

NORTON A. NEWDICK, OF COLUMBUS, OHIO, ASSIGNOR TO THE COLODER COMPANY, OF COLUMBUS, OHIO, A CORPORATION OF DELAWARE.

CONVEYER.

Application filed September 6, 1923. Serial No. 661,305.

*To all whom it may concern:*

Be it known that I, NORTON A. NEWDICK, a citizen of the United States, residing in Columbus, in the county of Franklin, State of Ohio, have invented certain new and useful Improvements in Conveyers, of which the following is a specification.

This invention relates to improvements in conveyers and is especially directed to an improved drag conveyer of a type consisting of a plurality of longitudinally extending transversely spaced endless chains, having connected therewith transversely extending longitudinally spaced flights or carrying blades, and one of the principal objects of the invention is to provide an improved connection between said chains and flights whereby the chain will be freely flexible for passage around sprockets or the like, and at the same time an exceptionally strong and durable connection provided adapting the flights for operation under severe loads.

In accordance with the invention there is provided a conveyer wherein the longitudinally extending chains are composed of a plurality of flexibly united links, having their adjoining ends connected by pins, around which the links pivot and said pins being provided between the links with rollers, adapting the chain for travel over a plane surface with but a minimum of resistance and friction, and in connecting the inner ends of certain of said pins with angle brackets to which the transversely extending flights are rigidly secured, the construction being such that the flights are supported in connection with a plurality of pins, producing thereby a substantial construction which presents an improvement over conveyers of this type wherein the flights are connected with off-set flanges or lips provided laterally on the links of the chains.

Another object of the invention resides in constructing the connection between the flights and the chains so that the said flights will be maintained in spaced relation from the plane surface over which the conveyer operates and which constitutes the bottom of the conveyer.

With these and other objects in view that will appear as the description proceeds, the invention consists in the various novel features of construction, combination of elements and arrangements of parts, hereinafter fully described and pointed out in the appended claims.

In the accompanying drawings:

Figure 3 is a transverse vertical sectional view taken on the line 3—3 of Figure 1.

Figure 4 is a sectional view on the plane indicated by the line 4—4 of Figure 2, and Figure 5 is a detailed view of one of the connecting angle brackets between the chain and flight members.

Figure 1:
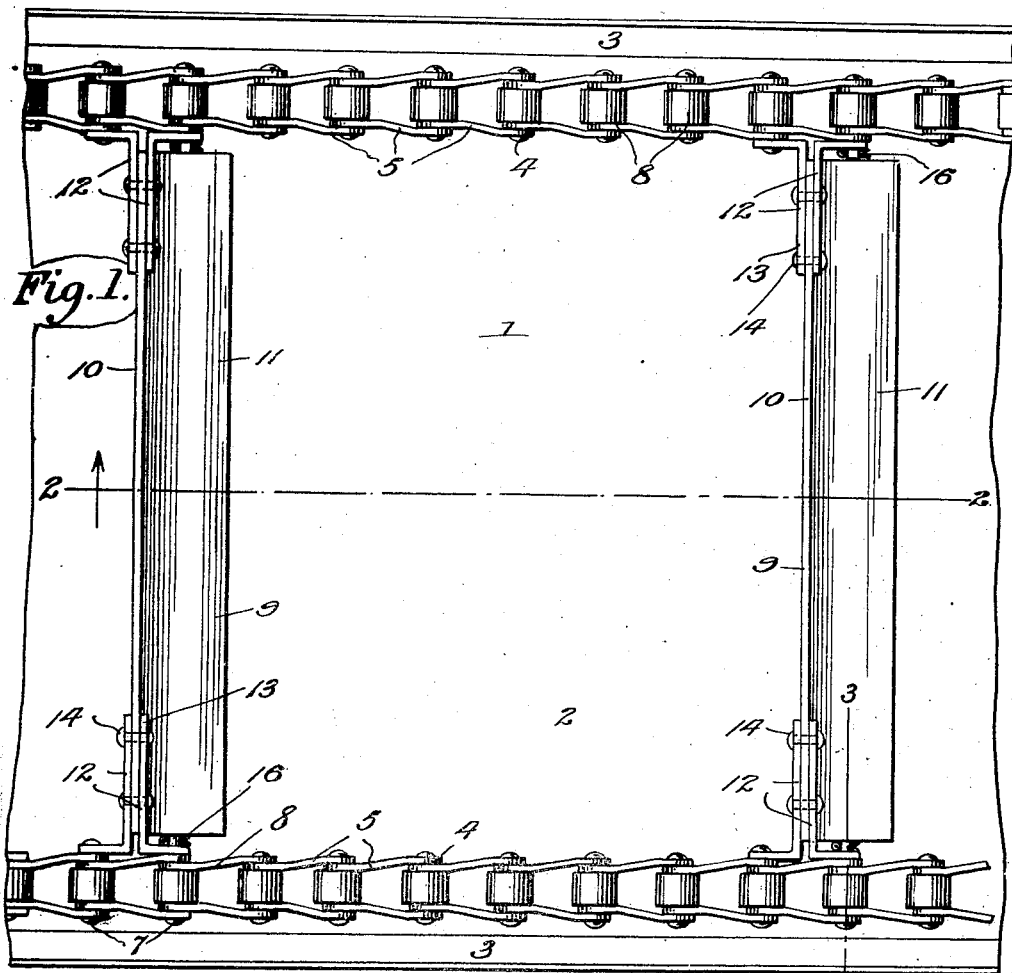
Figure 1 is a plan view of a drag conveyer constructed in accordance with the features of the present invention.
Figure 2:
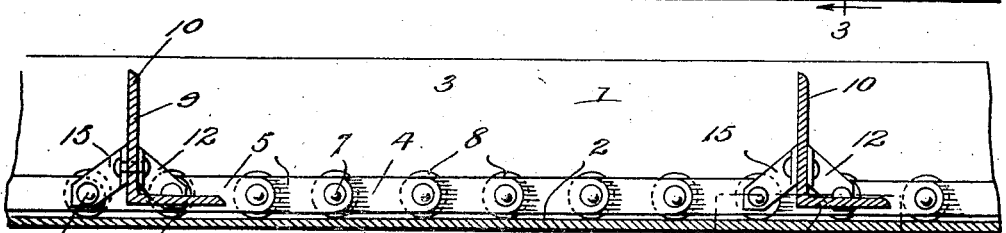
Figure 2 is a vertical longitudinal sectional view taken on the plane indicated by the line 2—2 of Figure 1.

Referring more particularly to the details of the invention, as the latter is specifically disclosed in the form illustrated in the accompanying drawings, the numeral 1 designates a conveying trough or way through which material is adapted to be conveyed. In the present instance the trough 1 consists of a thin sheet metal plate having a plane upper surface 2 over which the forward run of the conveyer moves in advancing material through the trough. The said trough is also provided with upstanding sides 3. Arranged for travel through the conveyer over the surface 2 and between the sides 3 is a conveyer which, when constructed in accordance with the present invention, comprises a pair of longitudinally extending, transversely spaced endless chains 4, which chains in this instance are constructed to include a plurality of links 5, having the adjoining ends thereof provided with registering openings 6 for the reception of pins 7, used in pivotally uniting the adjoining ends of said links and to render the chains flexible in a single plane. The said pins are provided between the ends of the links with rollers 8, which are arranged to rest directly upon the surface 2 of the trough, thereby causing the same to produce a rolling friction on the trough and thereby reduce friction losses. Extending between the chains 4 is a plurality of transversely disposed, longitudinally spaced flights 9, which in this instance are of angle construction and include vertical webs 10 and horizontally disposed webs 11 which, as shown in Figure 2, are arranged immediately above the surface 2 and out of engagement therewith. The ends of the flights are connected with the inner sides of the chains 4 so as to move in unison with said chains, whereby when the conveyer is in operation material deposited or disposed in the trough 1 will be engaged by the vertical webs of the flights 9 and caused to travel in unison with the conveyer over the upper surface of the trough 1, said surface constituting the bottom of the trough, and the conveyer described is particularly useful in handling coal or other substances of a like gritty nature, and the chain is substantially constructed to adapt itself to materials of this description. In this connection the horizontal web 11 of each of the flights 9 is provided to reinforce, strengthen or brace the vertical material engaging webs 10, enabling the latter to resist the bending or breaking stresses which the materials being conveyed exercise thereon.

In prior construction in conveyers of this character, it has been customary to provide the links of the chains with integral off-set flight attachments, in the nature of lugs, which extend laterally from the flight carrying links and are connected with opposite longitudinal ends of the flights. In this construction the load on the flights is directed upon the two links carrying the flights. It has been found in heavy work that this construction is too fragile and gives constant trouble by reason of the frequent breakage of the flight securing lugs, the links themselves and associated parts. To avoid this and to produce a stronger chain and one wherein repairs may be made quickly and conveniently, the present invention provides an attachment between the flights and links which consists of a plurality of angle brackets 12. These brackets are formed to include transversely extending arms 13 and are arranged in pairs so as to receive between them vertical webs 10 of the flights 9. Rivets or other fastenings 14 are used to unite the arms 13 with the ends of the flights 9. The inner ends of the arms 13 terminate in downwardly and outwardly extending relatively diverging arms 15, which are apertured to receive inner ends of the pins 7 employed in the chain construction, upon which pins the load on the flights is received. By this it will be observed that the load on each flight is distributed upon four pins, instead of being placed upon the links of the chain. Further, by the connection any tendency on the part of the flights to rock or rotate is effectively precluded and the horizontally extending web of each flight maintained in spaced relation from the surface 2. Thus, the construction avoids the use of special links, as is the practice in prior conveyers of this type, in the chains 4, permitting the use of standard chains through and yet produces a more substantial and durable construction with a better distribution thereon of working stresses and strains. The angle brackets 12 may be readily formed by cutting the same on a bias of standard angle stock. Certain of the pins 7 may be provided with openings in the inner ends thereof for the reception of cotter pins 16, permitting the chain to be readily assembled or disassembled and repairs or replacements made.

What is claimed is:

1. In a conveyer, a chain formed to comprise a plurality of links, pivotal connections between the adjoining ends of said links permitting the chain to flex in a single plane, a pair of complemental brackets carried by a pair of adjoining pivotal connections between said links, and a material conveying flight rigidly connected with said brackets.

2. In a conveyer, a chain including a plurality of links having flexible connections between the ends thereof, a pair of upwardly extending brackets carried by an adjoining pair of said pivotal connections, and a flight connected with said brackets in a plane above that of the pivotal connections.

In testimony whereof I have signed my name to this specification.

NORTON A. NEWDICK.